(12) United States Patent
Moon et al.

(10) Patent No.: US 10,815,136 B2
(45) Date of Patent: Oct. 27, 2020

(54) DEIONIZATION FILTER DEVICE AND WATER TREATMENT DEVICE COMPRISING DEIONIZATION FILTER DEVICE

(71) Applicant: COWAY CO., LTD., Chungcheongnam-do (KR)

(72) Inventors: Sung-Min Moon, Seoul (KR); Jun-Young Lee, Seoul (KR); Guk-Won Lee, Seoul (KR); Sang-Hyeon Kang, Seoul (KR)

(73) Assignee: Coway Co., Ltd (KR)

( * ) Notice: Subject to any disclaimer, the term of this patent is extended or adjusted under 35 U.S.C. 154(b) by 71 days.

(21) Appl. No.: 15/777,455

(22) PCT Filed: Nov. 10, 2016

(86) PCT No.: PCT/KR2016/012910
§ 371 (c)(1),
(2) Date: May 18, 2018

(87) PCT Pub. No.: WO2017/086657
PCT Pub. Date: May 26, 2017

(65) Prior Publication Data
US 2018/0326356 A1 Nov. 15, 2018

(30) Foreign Application Priority Data
Nov. 19, 2015 (KR) .................. 10-2015-0162753
Nov. 9, 2016 (KR) .................. 10-2016-0149014

(51) Int. Cl.
*C02F 1/469* (2006.01)
*B01D 61/54* (2006.01)
(Continued)

(52) U.S. Cl.
CPC .......... *C02F 1/4695* (2013.01); *B01D 61/445* (2013.01); *B01D 61/48* (2013.01);
(Continued)

(58) Field of Classification Search
CPC ..................................... C02F 1/4695
See application file for complete search history.

(56) References Cited

U.S. PATENT DOCUMENTS 5,788,826 A 8/1998 Nyberg
2012/0234763 A1 9/2012 Kim et al.
(Continued)

FOREIGN PATENT DOCUMENTS

KR 100518045 9/2005
KR 1020080043894 5/2008
(Continued)

OTHER PUBLICATIONS

PCT/ISA/210 Search Report issued on PCT/KR2016/012910 pp. 4.

*Primary Examiner* — Nicholas A Smith
(74) *Attorney, Agent, or Firm* — The Farrell Law Firm, P.C.

(57) ABSTRACT

A deionization filter device includes a first electrode, a second electrode, at least one bipolar ion exchange sheet configured to include a cation exchange film and an anion exchange film, and disposed between the first electrode and the second electrode, a voltage source configured to apply a deionization voltage or a reproduction voltage between the first electrode and the second electrode, a pH sensor configured to detect a pH value of a solution to be treated by a voltage applied by the voltage source, and a controller configured to control the voltage source, depending on a pH value of the solution.

10 Claims, 7 Drawing Sheets

(51) Int. Cl.
    *B01D 61/44*         (2006.01)
    *B01D 61/48*         (2006.01)
    *C02F 1/461*         (2006.01)

(52) U.S. Cl.
    CPC .......... *B01D 61/54* (2013.01); *C02F 1/46104* (2013.01); *C02F 2001/46128* (2013.01); *C02F 2001/46152* (2013.01); *C02F 2201/46135* (2013.01); *C02F 2209/06* (2013.01); *C02F 2303/22* (2013.01)

(56) References Cited

U.S. PATENT DOCUMENTS

| | | |
|---|---|---|
| 2014/0158539 A1 | 6/2014 | Lee et al. |
| 2014/0353167 A1 | 12/2014 | Cho |

FOREIGN PATENT DOCUMENTS

| | | |
|---|---|---|
| KR | 1020120104719 | 9/2012 |
| KR | 1020120132324 | 12/2012 |
| KR | 1020150010089 | 1/2015 |

DEIONIZATION FILTER DEVICE AND WATER TREATMENT DEVICE COMPRISING DEIONIZATION FILTER DEVICE

PRIORITY

This application is a National Phase Entry of International Application No. PCT/KR2016/012910, which was filed on Nov. 10, 2016, and claims priority to Korean Patent Application Nos. 10-2015-0162753 and 10-2016-0149014, which were filed on Nov. 19, 2015 and Nov. 9, 2016, respectively, the contents of each of which are incorporated herein by reference.

TECHNICAL FIELD

The present disclosure relates to a deionization filter device, and a water treatment device including the deionization filter device.

BACKGROUND ART

Recently, a deionization filter for removing ionic substances contained in raw water, using electrical attraction force has been actively studied.

For example, a deionization filter in which a deionization operation is performed using a bipolar ion exchange film having a cation exchange film and an anion exchange film has been proposed.

However, it has been difficult to maintain an appropriate pH value of water by a difference in ion exchange capacities of bipolar exchange films constituting a bipolar ion exchange film.

Specifically, when a deionization operation is performed using bipolar ion exchange films, a pH value of purified water may be lowered due to unbalance of ion exchange capacities, which may be inadequate for water quality standards for drinking water.

Also, in a case of performing a recycling operation of bipolar ion exchange films, a pH value of water used for a recycling operation may be increased and may become alkaline due to an imbalance of ion exchange capacities, and, subsequently, ions detached from the bipolar ion exchange films may be easily bonded each other to generate scale.

The following patent document 1 discloses an electrochemical ion exchange.

Korean Patent No. 10-0518045

DISCLOSURE

Technical Problem

An aspect of the present disclosure is to provide a deionization filter device, and a water treatment device including the deionization filter device, to solve the problems of the prior art described above. The deionization filter device is configured to measure a pH value of water to be treated by the deionization filter device, and to adjust a type and magnitude of voltages applied to electrodes, depending on the measured pH value of water, to allow a pH value of water purified by a deionization operation not to deviate from a pH value range according to water quality standards for drinking water. Further, when performing a recycling operation, the deionization filter device is configured to adjust a pH value of water generated by a reproduction voltage to be equal to or lower than a reference value to prevent an occurrence of scale.

Technical Solution

According to an aspect of the present disclosure, a deionization filter device includes a first electrode, a second electrode, at least one bipolar ion exchange sheet including a cation exchange film and an anion exchange film, and disposed between the first electrode and the second electrode, a voltage source configured to apply a deionization voltage or a reproduction voltage between the first electrode and the second electrode, a pH sensor configured to detect a pH value of a solution to be treated by a voltage applied by the voltage source, and a controller configured to control the voltage source, depending on a pH value of the solution.

In an aspect, the cation exchange film may include a cation adsorption sheet and a cation exchange coating layer, the anion exchange film may include an anion adsorption sheet and an anion exchange coating layer, and the cation exchange coating layer and the anion exchange coating layer may be bonded to face each other.

In an aspect, the bipolar ion exchange sheet may further include a water splitting catalyst layer formed between the cation exchange coating layer and the anion exchange coating layer.

In an aspect, the cation adsorption sheet and the anion adsorption sheet are porous sheets.

In an aspect, the porous sheet is an extruded film.

In an aspect, the controller is configured to adjust a type and magnitude of voltages applied to the first electrode and the second electrode, depending on a pH value of the solution.

In an aspect, the controller is configured to adjust a magnitude of a deionization voltage, such that a pH value of the solution is included in a predetermined first range, when the deionization voltage is applied to the first electrode and the second electrode.

In this case, the controller is configured to change the deionization voltage applied to the first electrode and the second electrode to a reproduction voltage, when a pH value of the solution is lower than a minimum value of the first range.

In an aspect, the controller is configured to adjust a magnitude of a reproduction voltage, so that a pH value of the solution is equal to or lower than a predetermined first reference value, when the reproduction voltage is applied to the first electrode and the second electrode.

In this case, the controller is configured to stop the application of the reproduction voltage, when a pH value of the solution exceeds the first reference value, and discharges the solution.

In an aspect, the first range is 5.8 to less than 8.5.

In an aspect, the first reference value is 9.

According to an aspect of the present disclosure, a water treatment device including the deionization filter device described above is provided.

Advantageous Effects

According to an aspect of the present disclosure, the present disclosure solves the problems of the prior art described above, and provides a remarkable effect, which may be exerted by way of measuring a pH value of water to be treated by the deionization filter device, and adjusting a type and magnitude of voltages applied to electrodes, depending on the measured pH value of water, to allow a pH value of a water purified by a deionization operation not to deviate from a pH value range according to water quality standards for drinking water, and, adjusting a pH value of water generated by a reproduction voltage to be equal to or lower than a reference value to prevent an occurrence of scale.

BEST MODE FOR INVENTION

Hereinafter, exemplary embodiments of the present disclosure will be described with reference to the accompanying drawings.

The embodiments of the present disclosure may be modified to have various other forms, and the scope of the present disclosure is not limited to the embodiments described below. Further, the embodiments of the present disclosure are provided to more fully explain the present disclosure to those skilled in the art.

In the drawings referred to in the present disclosure, elements having substantially the same configuration and function will be denoted by the same reference numerals, and shapes, sizes, and the like of elements in the drawings may be exaggerated for clarity.

Figure 1:
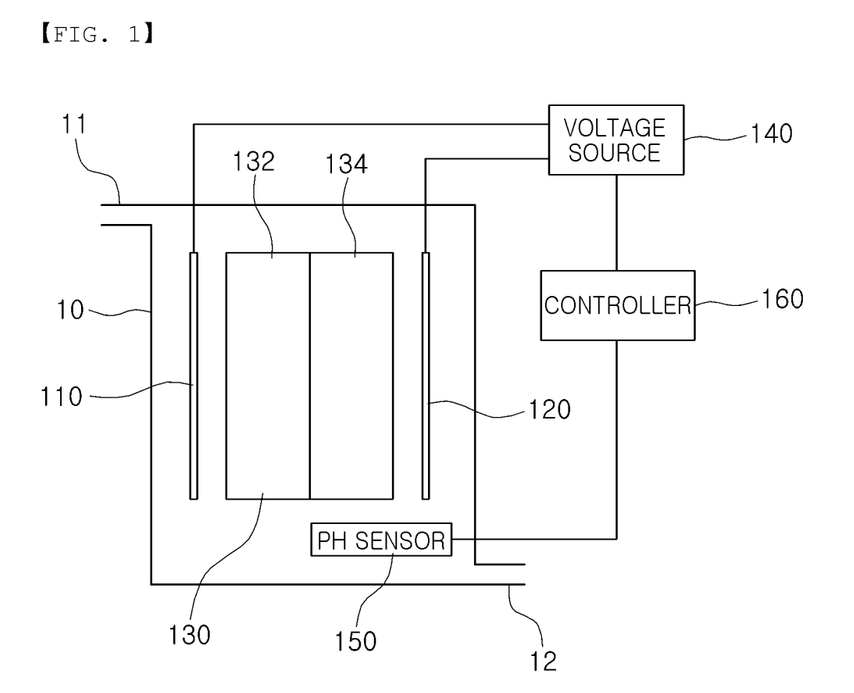
FIG. 1 is a block diagram illustrating a deionization filter device according to an exemplary embodiment in the present disclosure.

FIG. 1 is a block diagram illustrating a deionization filter device according to an exemplary embodiment.

Referring to FIG. 1, the deionization filter device according to an exemplary embodiment may include a first electrode 110, a second electrode 120, a bipolar ion exchange sheet 130, a voltage source 140, a pH sensor 150, and a controller 160.

A deionization voltage or a reproduction voltage may be applied to the first electrode 110 and the second electrode 120 by the voltage source 140. The first electrode 110 and the second electrode 120 may be disposed inside a housing 10 having an inlet 11 into which water flows, and an outlet 12 from which water flows.

Figure 7:
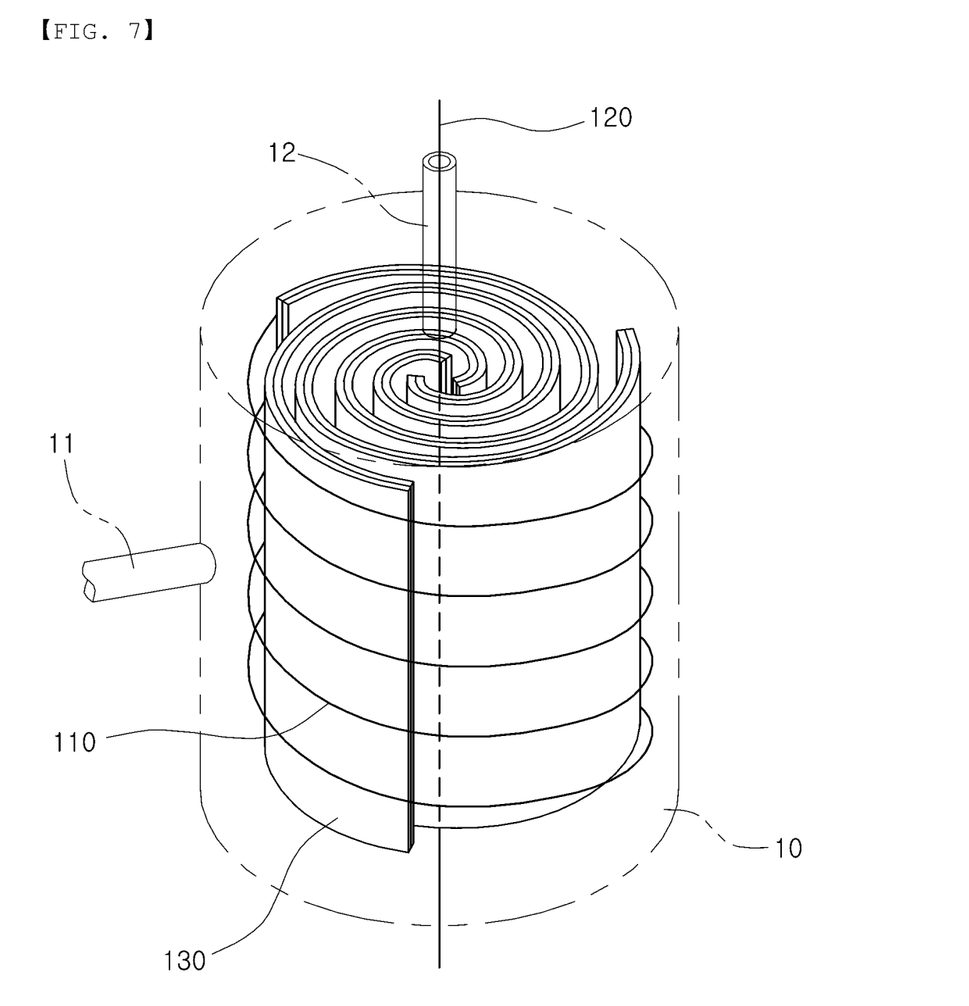
FIG. 7 is a perspective view illustrating a deionization filter device according to an exemplary embodiment in the present disclosure.

The bipolar ion exchange sheet 130 may be disposed between the first electrode 110 and the second electrode 120. The bipolar ion exchange sheet 130 may include an anion exchange film 132 disposed towards the first electrode 110, and a cation exchange film 134 disposed towards the second electrode 120. The bipolar ion exchange sheet 130 disposed between the first electrode 110 and the second electrode may be provided in plural. In an example embodiment, the plurality of bipolar ion exchange sheets 130 may be arranged spirally as shown in FIG. 7.

In the bipolar ion exchange sheet 130, when water flows into the inlet 11 of the housing 10, and a deionization voltage is applied to the first electrode 110 and the second electrode 120, the cation and anion components contained in the water may be separated by the attraction force induced by the deionization voltage, and may be transferred to the anion exchange film 132 and the cation exchange film 134, respectively. On the other hand, when a reproduction voltage is applied to the first electrode 110 and the second electrode 120, the cation and anion components adsorbed to the anion exchange film 132 and the cation exchange film 134 by the deionization operation may be detached from the anion exchange film 132 and the cation exchange film 134, respectively, by repulsive force induced by the reproduction voltage.

Such a bipolar ion exchange sheet 130 will be described in more detail below with reference to FIGS. 2 and 3.

Figure 2:
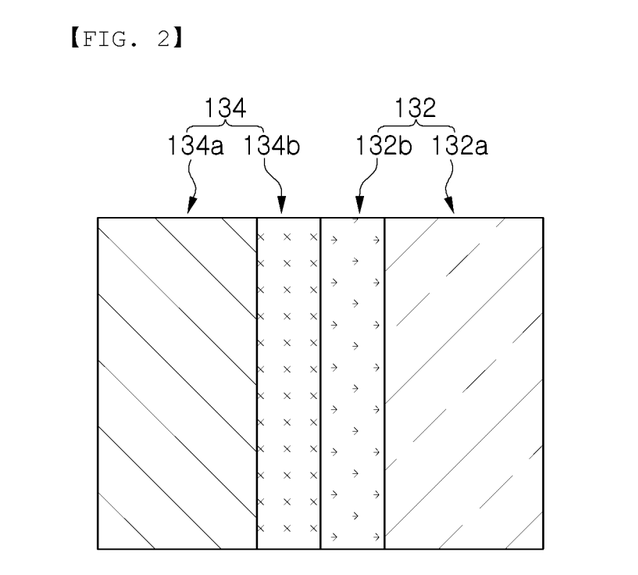
FIG. 2 is a view schematically illustrating an example of a cross-sectional structure of the bipolar ion exchange sheet shown in FIG. 1.
Figure 3:
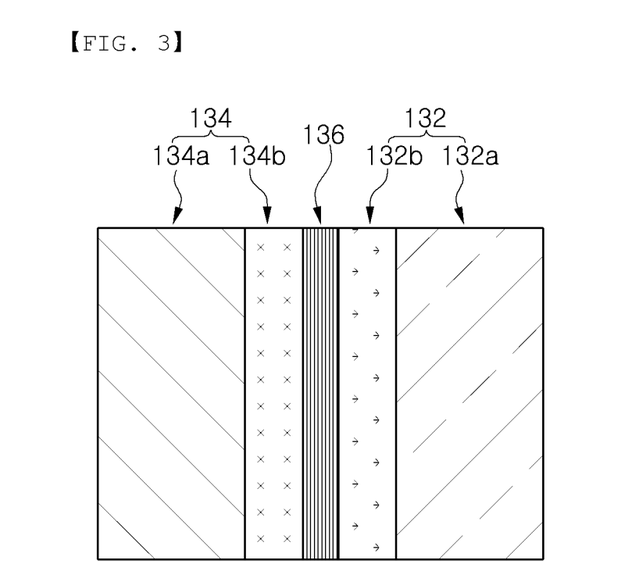
FIG. 3 is a view schematically illustrating another example of a cross-sectional structure of the bipolar ion exchange sheet shown in FIG. 1.

FIG. 2 is a view schematically illustrating an example of a sectional structure of the bipolar ion exchange sheet shown in FIG. 1, and FIG. 3 is a view schematically illustrating another example of a sectional structure of the bipolar ion exchange sheet shown in FIG. 1.

According to an exemplary embodiment, as shown in FIG. 2, the cation exchange film 134 may include a cation adsorption sheet 134a and a cation exchange coating layer 134b, the anion exchange film 132 may include an anion adsorption sheet 132a and an anion exchange coating layer 132b, and the cation exchange coating layer 134b and the anion exchange coating layer 132b may be bonded to face each other to form the bipolar ion exchange sheet 130.

For example, a cation exchange film 134 and a anion exchange film 132 may be made by applying and drying an ion exchange coating solution on ion adsorption sheets 134a and 132a to form the ion exchange coating layers 134b and 132b, respectively, and a bipolar ion exchange sheet 130 may be made by bonding the cation exchange film 134 and the anion exchange film 132 to allow the cation exchange coating layer 134b and the anion exchange coating layer 132b to face each other. Thus, a difference in adsorption capacities between the cation exchange film 134 and the anion exchange film 132 may be significantly reduced.

In this case, the ion adsorption sheets 134a and 132a may adsorb ions by ion exchange process, and may be embodied as a porous sheet. When the porous sheet is used as ion adsorption sheets 134a and 132a, membrane resistance may be lowered, and an adsorption ability of ions may be further improved, and furthermore, water splitting efficiency may be improved.

Further, the porous sheet may be an extruded film. Since the extruded film may be manufactured in a relatively simple process, manufacturing costs of the ion adsorption sheets 134a and 132a may be significantly reduced. Therefore, the ion exchange coating layers 134b and 132b having a considerably low thickness may be accomplished by applying an ion exchange coating solution on surfaces of the ion adsorption sheets 134a and 132a made of extruded films to form the ion exchange coating layers 134b and 132b.

Meanwhile, the ion exchange coating solution is an ion exchange polymer having an ion exchanging group dissolved in an organic solvent. The ion exchange coating solution may be applied to one surface of the ion adsorption sheets 134a and 132a, and then dried to form the ion exchange coating layers 134b and 132b including an ion exchange polymer having an ion exchanging group.

In this case, the ion exchange coating layers 134b and 132b may serve for providing bonding force between the ion exchange films 134 and 132 having both polarities. The ion exchange coating layers 134b and 132b may be heated and pressed at the time of bonding of the ion exchange films 134 and 132 having both polarities, and then bonded to each other. If necessary, the ion exchange coating layers may be bonded to each other in an incompletely dry state of any one of the ion exchange coating layers, thereby the bonding efficiency may be improved.

According to another exemplary embodiment in the present disclosure, as shown in FIG. 3, a water splitting catalyst layer 136 provided between the cation exchange coating layer 134b and the anion exchange coating layer 132b may further be included.

In this case, the water splitting catalyst layer 136 may be provided to promote water splitting efficiency, and may be made by applying a slurry including a metal hydroxide nanopowder, such as iron hydroxide ($Fe(OH)_3$, $Fe(OH)_2$) or chromium hydroxide ($Cr(OH)_2$), dispersed in a solvent on any one of ion exchange coating layers, and then drying.

A voltage source 140 may apply a deionization voltage or a reproduction voltage to the first electrode 110 and the second electrode 120 under control of the controller 160. The voltage source 140 may adjust a pH value of water by controlling voltages applied to the first electrode 110 and the second electrode 120 under control of the controller 160.

A pH sensor 150 may be disposed inside a housing 10 to detect a pH value of water. In this case, the pH sensor 150 may be disposed adjacent to an outlet 12 into which water, having passed through the bipolar ion exchange sheet 130, is discharged, to detect a pH value of water to be treated by voltage applied by the voltage source 140. The pH sensor 150 may detect a pH value of water, and output the detected pH value to the controller 160.

The controller 160 may control a type and magnitude of voltage applied to the voltage source 140. The controller 160 may control the voltage source 140 to apply a deionization voltage to the first electrode 110 and the second electrode 120 to remove ions from incoming water. In this case, the removed ions may be adsorbed to the bipolar ion exchange sheet 130. In this case, the voltage source 140 may be controlled to apply a reproduction voltage to the first electrode 110 and the second electrode 120 to flush the adsorbed ions.

In addition, when a deionization voltage is applied, the controller 160 may adjust a magnitude of the deionization voltage to adjust a total dissolved solids (TDS) value of water. In this case, as the deionization voltage is high, ion removal rate of water may be increased, so that the TDS value is lowered.

In an example embodiment, the controller 160 may include at least one processing unit and memory. The processing unit may include a central processing unit (CPU), a graphics processing unit (GPU), a microprocessor, an application specific integrated circuit (ASIC), a field programmable gate array (FPGA), or the like, and may have a plurality of cores. The memory may be a volatile memory, a non-volatile memory, or a combination thereof.

The controller 160 may adjust a type and magnitude of voltages applied to the first electrode 110 and the second electrode 120, depending on a pH value of water detected by the pH sensor 150.

Such a controller 160 will be described in more detail below with reference to FIGS. 4 to 6.

Figure 4:
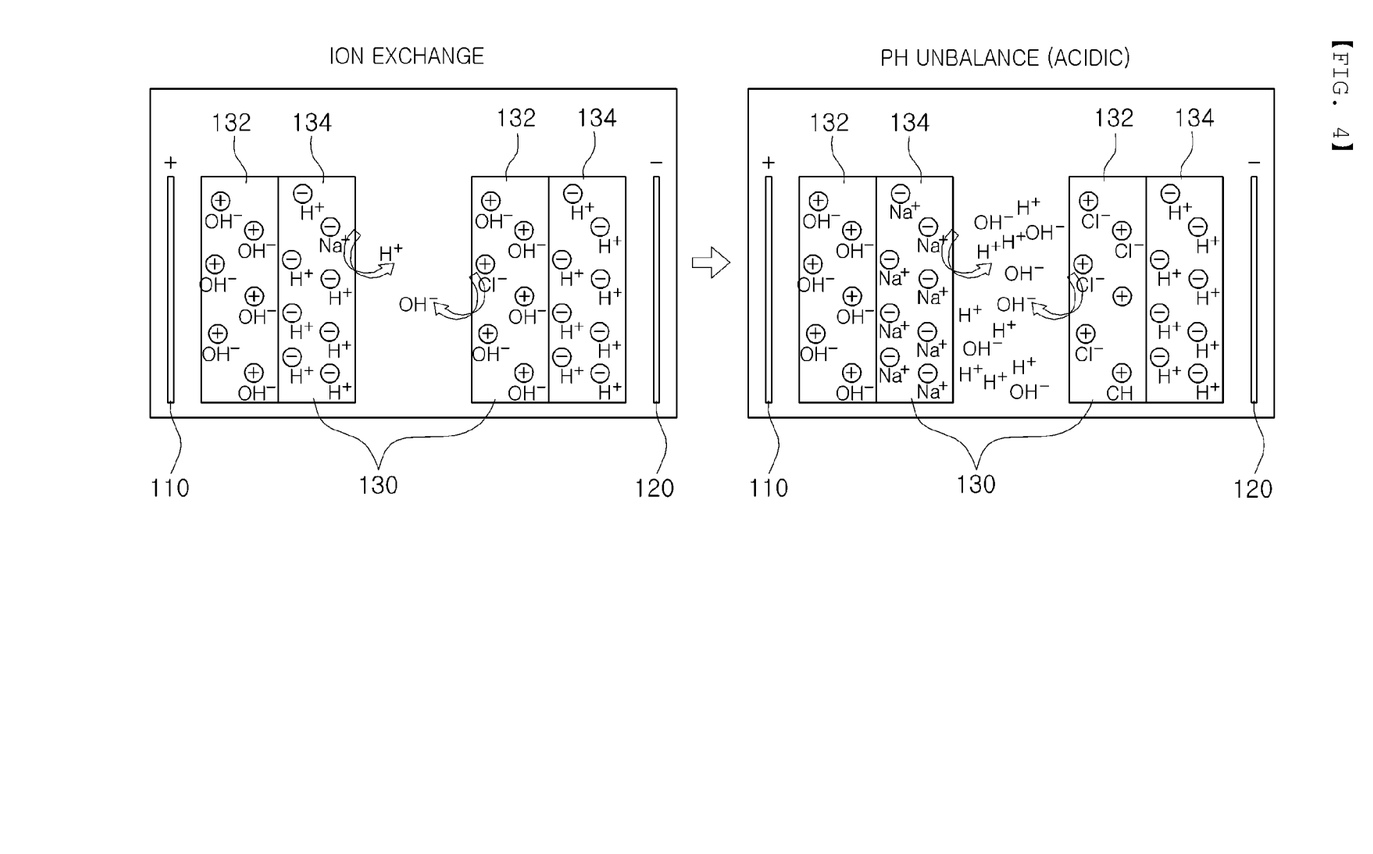
FIG. 4 is a conceptual diagram for illustrating a case in which a deionization voltage is applied to a first electrode and a second electrode.
Figure 5:
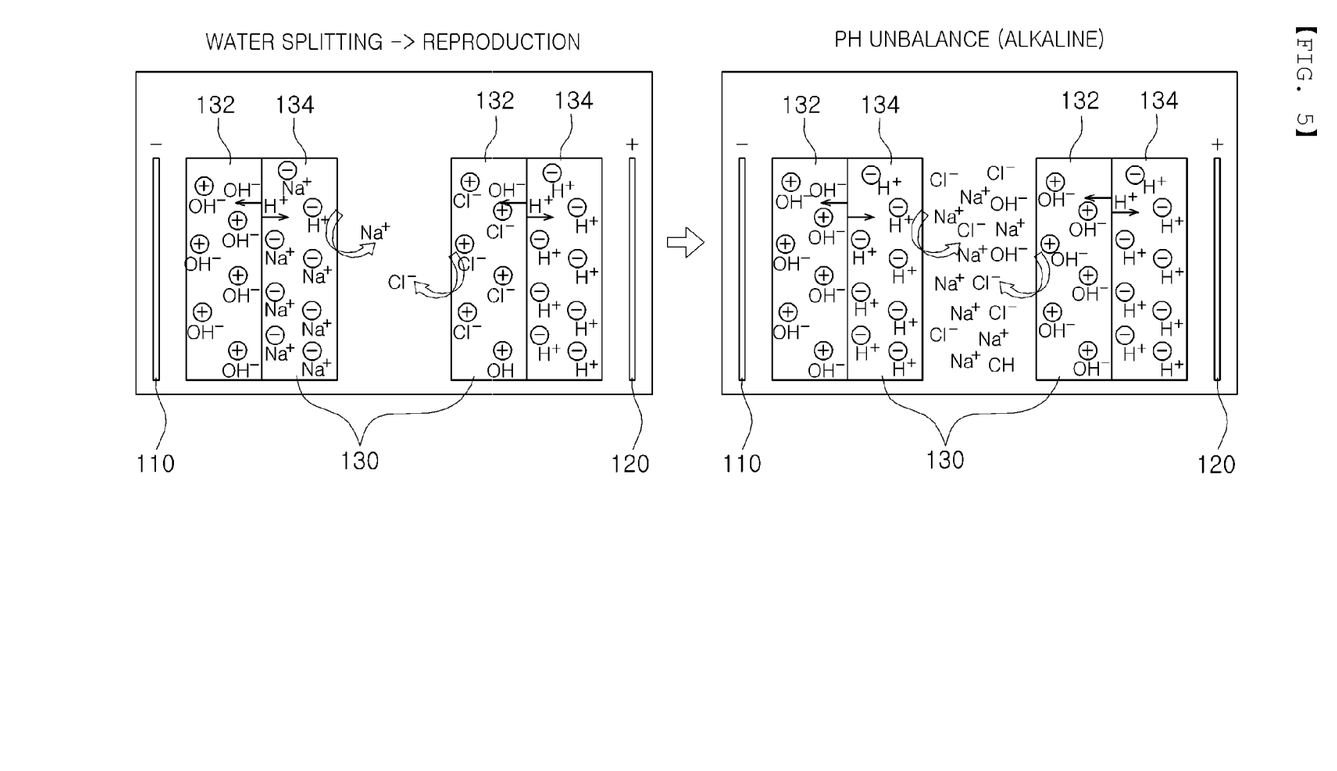
FIG. 5 is a conceptual diagram for illustrating a case in which a reproduction voltage is applied to a first electrode and a second electrode.
Figure 6:
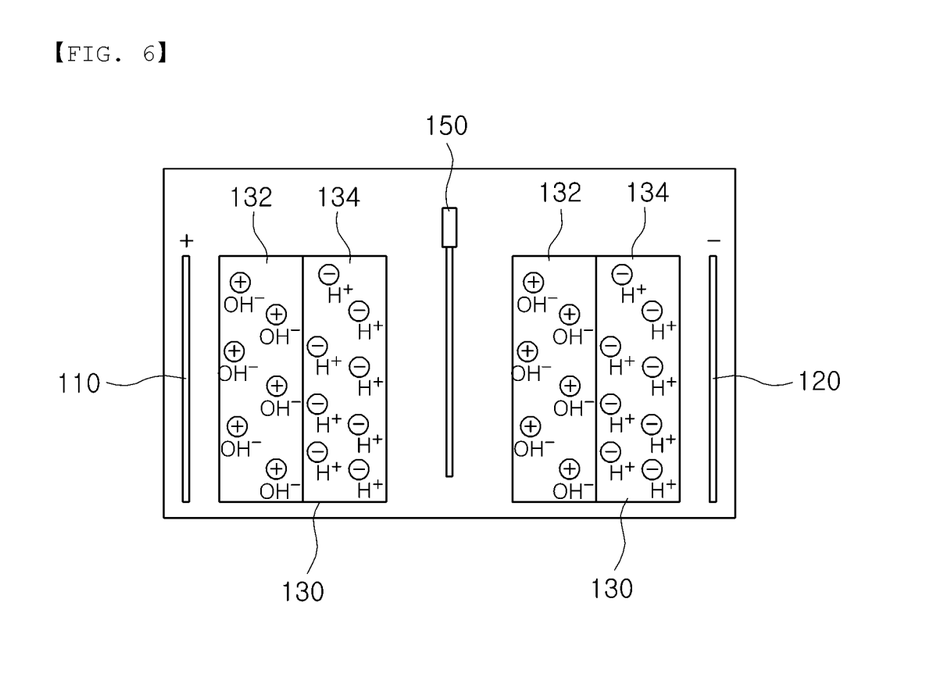
FIG. 6 is a conceptual diagram for illustrating the deionization filter device of FIG. 1.

FIG. 4 is a conceptual view for explaining a case in which a deionization voltage is applied to a first electrode and a second electrode, FIG. 5 is a conceptual view for explaining a case in which a reproduction voltage is applied to a first electrode and a second electrode, and FIG. 6 is a conceptual diagram for illustrating the deionization filter device of FIG. 1.

Referring to FIG. 4, when a deionization voltage is applied to a first electrode 110 and a second electrode 120, the first electrode 110 becomes a positive electrode, and the second electrode 120 becomes a negative electrode.

In this case, when a deionization voltage is applied to the first electrode 110 and the second electrode 120, $H^+$ adsorbed on the cation exchange film 134, and $OH^-$ adsorbed on the anion exchange film 132 may be exchanged with cations ($Na^+$) and anions ($Cl^-$) in water, respectively. In this case, when the adsorption capacities of the cation exchange film 134 and the anion exchange film 132 are different from each other, ion exchange capacities between the cation exchange film 134 and the anion exchange film 132 may be not balanced. When an amount of $H^+$ is relatively high, due to a difference in adsorption capacities, a pH value of water passing through a deionization filter device may become acidic.

In the meantime, since a pH value of purified water according to water quality standards for drinking water is in the range of 5.8 to 8.5, control of the voltage source 140 may be needed, so that the pH value of the water passing through the deionization filter device does not deviate from the defined range.

Referring to FIG. 5, when a reproduction voltage is applied to a first electrode 110 and a second electrode 120, the first electrode 110 becomes a negative electrode, and the second electrode 120 becomes a positive electrode.

In this case, when a reproduction voltage is applied to the first electrode 110 and the second electrode 120, cations ($Na^+$) and anions ($Cl^-$) adsorbed to the anion exchange film 132 and the cation exchange film 134, respectively, by electric repulsive force induced by the reproduction voltage may be removed therefrom, and may be dissolved in water entered into a housing 10.

Even in a case in which a reproduction voltage is applied, when there is a difference in adsorption capacities between the cation exchange film 134 and the anion exchange film 132, an unbalance in ion exchange capacities between the cation exchange film 134 and the anion exchange film 132 may be occurred.

In this case, when $OH^-$ is generated more than $H^+$, a pH value of water passing through a deionization filter device becomes alkaline. When a pH value becomes relatively high and becomes alkaline, ions falling off from the bipolar ion exchange sheet 130 may be bonded, and, thus, a problem may arise in which scale may be generated in a deionization filter device, or an internal device, such as a drain valve.

According to an exemplary embodiment described above, by forming the bipolar ion exchange sheet 130 as shown in FIG. 2 or 3, a difference in adsorption capacities of the ion exchange films 134 and 132 having both polarities may be significantly reduced. Even in this case, an unbalance in ion exchange capacities may be still occurred.

In order to solve the above problems, a deionization filter device according to an exemplary embodiment of the present disclosure may include a pH sensor 150 for detecting a pH value of water to be treated by a voltage applied by the voltage source 140, and a controller 160 adjusting a type and magnitude of voltages applied to the first electrode 110 and the second electrode 120, depending on a pH value of water sensed by the pH sensor 150. Accordingly, when a deionization voltage is applied, a pH value of purified water generated by a deionization voltage may be adjusted not to deviate from the pH value range according to water quality standards for drinking water, and, when a reproduction voltage is applied, a pH value of water due to the reproduction voltage may be adjusted to be equal to or lower than a reference value, and thus may be adjusted such that scale may not occur.

Specifically, when a deionization voltage is applied, the controller 160 may adjust a magnitude of the deionization voltage, so that a pH value of water to be occurred by the deionization voltage falls within a predetermined first range, such as 5.8 to 8.5, based on a pH value of water output from the pH sensor 150.

In this case, when a pH value of water output from the pH sensor 150 is lower than the minimum value of the first range, for example, less than 5.8, a type of voltage applied to the first electrode 110 and the second electrode 120 may be changed from a deionization voltage to a reproduction voltage by the controller 160, to prevent the supply of acidic water to a user.

When a reproduction voltage is applied, the controller 160 may adjust a pH value of water supplied to recycle the bipolar ion exchange sheet 130 to be equal to or lower than a predetermined first reference value, for example, 9 or less, based on a pH value of water output from the pH sensor 150.

In this case, when a pH value of water supplied to recycle the bipolar ion exchange sheet 130 exceeds a predetermined first reference value, the controller 160 may stop applying a reproduction voltage and discharge water externally to prevent an occurrence of scale.

According to an embodiment of the present disclosure, a water processor (not shown) including the deionization filter device of FIG. 1 described above may be provided.

MODE FOR INVENTION

Figure 8:
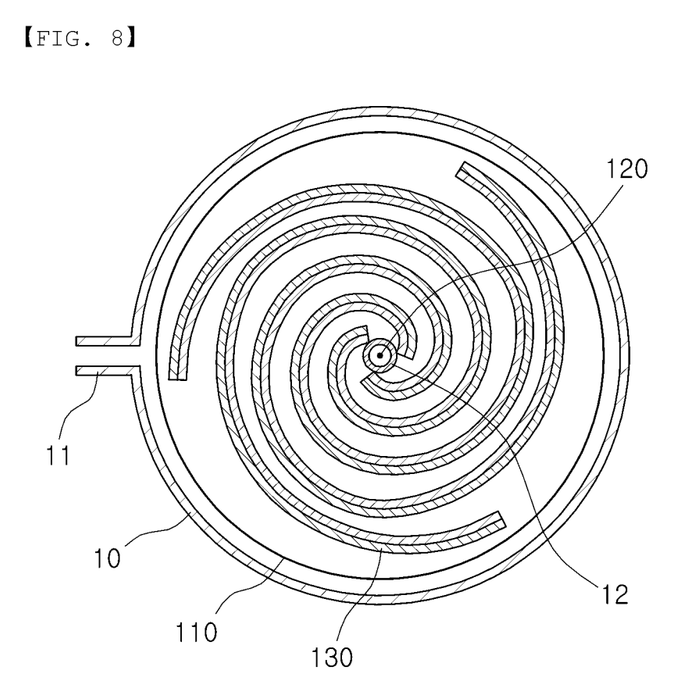
FIG. 8 is a cross-sectional view of the deionization filter device shown in FIG. 7.

FIG. 7 is a perspective view illustrating a deionization filter device, and FIG. 8 is a cross-sectional view of the deionization filter device of FIG. 7.

Referring to FIGS. 7 and 8, a deionization filter device may include a plurality of bipolar ion exchange sheets 130, and the plurality of bipolar ion exchange sheets 130 may be spirally arranged around a second electrode 120 disposed at a center of a housing 10 in a cylindrical form.

In this case, a first electrode 110 may be formed to spirally surround outer circumferential surfaces of a plurality of bipolar ion exchange sheets 130 arranged in spiral forms.

According to such an arrangement, in the plurality of bipolar ion exchange sheets 130, an anion exchange film 132 may be disposed towards a first electrode 110, and a cation exchange film 134 may be disposed towards a second electrode 120.

When water is entered into an inlet 11 disposed on a side surface of the housing 10, purified water or recycled water may be discharged through an outlet 12 by passing through the bipolar ion exchange sheets 130.

In this case, although not shown in FIGS. 7 and 8, a pH sensor 150 may be disposed an inside of the outlet 12 or adjacent to the outlet 12 to measure a pH value of water to be purified by passing through the bipolar ion exchange sheet 130 or recycled water.

It is to be understood that both the foregoing general description and the following detailed description are exemplary and explanatory and are not to be construed as limiting the invention in its broader aspects. It will be understood by those skilled in the art that various changes in form and details may be made therein without departing from the spirit and scope of the invention as defined by the appended claims.

The invention claimed is:

1. A deionization filter device comprising:
   a first electrode;
   a second electrode;
   at least one bipolar ion exchange sheet configured to include a cation exchange film and an anion exchange film, and disposed between the first electrode and the second electrode;
   a voltage source configured to apply a deionization voltage or a reproduction voltage between the first electrode and the second electrode;
   a pH sensor configured to detect a pH value of a solution to be treated by a voltage applied by the voltage source; and
   a controller programmed to:
      control the voltage source, depending on a pH value of the solution,
      adjust a type and magnitude of voltages applied to the first electrode and the second electrode, depending on a pH value of the solution detected by the pH sensor,
      adjust a magnitude of a deionization voltage so that a pH value of the solution is included in a predetermined first range, when the deionization voltage is applied to the first electrode and the second electrode, and
      change the deionization voltage applied to the first electrode and the second electrode to a reproduction voltage, when a pH value of the solution detected by the pH sensor is lower than a minimum value of the first range.

2. The deionization filter device according to claim 1, wherein the cation exchange film is configured to comprise a cation adsorption sheet and a cation exchange coating layer, wherein the anion exchange film is configured to comprise an anion adsorption sheet and an anion exchange coating layer, wherein the cation exchange coating layer and the anion exchange coating layer are bonded to face each other.

3. The deionization filter device according to claim 2, wherein the bipolar ion exchange sheet is configured to further comprise a water splitting catalyst layer formed between the cation exchange coating layer and the anion exchange coating layer.

4. The deionization filter device according to claim 2, wherein the cation adsorption sheet and the anion adsorption sheet are porous sheets.

5. The deionization filter device according to claim 4, wherein the porous sheet is an extruded film.

6. The deionization filter device according to claim 1, wherein the controller is programmed to adjust a magnitude of a reproduction voltage, so that a pH value of the solution detected by the pH sensor is equal to or lower than a predetermined first reference value, when a reproduction voltage is applied to the first electrode and the second electrode.

7. The deionization filter device according to claim 6, wherein the controller is programmed to stop the application of the reproduction voltage, and to discharge the solution, when a pH value of the solution exceeds the first reference value.

8. The deionization filter device according to claim 1, wherein the first range is 5.8 to less than 8.5.

9. The deionization filter device according to claim 6, wherein the first reference value is 9.

10. A water treatment device comprising the deionization filter device according to claim 1.

* * * * *